United States Patent
Ahn

(10) Patent No.: US 10,095,354 B2
(45) Date of Patent: Oct. 9, 2018

(54) PEN INPUT DEVICE, METHOD FOR CORRECTING INPUT COORDINATE THEREOF AND ELECTRONIC DEVICE FOR SUPPORTING THE SAME

(71) Applicant: Samsung Electronics Co., Ltd., Gyeonggi-do (KR)

(72) Inventor: Heetae Ahn, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 85 days.

(21) Appl. No.: 14/953,237

(22) Filed: Nov. 27, 2015

(65) Prior Publication Data

US 2016/0154528 A1      Jun. 2, 2016

(30) Foreign Application Priority Data

Nov. 28, 2014   (KR) .................. 10-2014-0168679

(51) Int. Cl.
  *G06F 3/041* (2006.01)
  *G06F 3/0354* (2013.01)
  (Continued)

(52) U.S. Cl.
  CPC .......... *G06F 3/0418* (2013.01); *G06F 3/038* (2013.01); *G06F 3/03545* (2013.01);
  (Continued)

(58) Field of Classification Search
  USPC ....................................... 345/174; 178/19.01
  See application file for complete search history.

(56) References Cited

U.S. PATENT DOCUMENTS 6,552,538 B2 *   4/2003   DeMeester .......... G01R 33/583
                                                            324/307
6,556,190 B2 *   4/2003   Fleck .................. G06F 3/03545
                                                            178/19.01

(Continued)

FOREIGN PATENT DOCUMENTS

EP        2933710 A1       10/2015
JP        09-230989         9/1997
KR    20-2011-008022 U      8/2011
WO    WO 2014/097953 A1     6/2014

OTHER PUBLICATIONS

Partial European Search Report dated Apr. 28, 2016 in connection with European Application 15196498.8; 9 pages.

*Primary Examiner* — Jennifer Mehmood
*Assistant Examiner* — Deeprose Subedi

(57) ABSTRACT

An electronic device and a method for correcting an input coordinate of the electronic device are provided. The electronic device includes a pen input device configured to support an electromagnetic induction function and an electrostatic pen function; a touch screen including a digitizer pad, an electrostatic capacitive touch panel disposed above the digitizer pad, a digitizer pad controller configured to detect a recognition coordinate calculated from electromagnetic induction from the digitizer pad, and a touch panel controller configured to detect an input coordinate in relation to a change of an electrostatic capacitance from the touch panel; and a processor configured to generate inclination information of the pen input device and coordinate correction based on a write pressure of the pen input device, the recognition coordinate information provided by the digitizer pad controller, and the input coordinate information provided by the electrostatic capacitive touch panel controller.

20 Claims, 9 Drawing Sheets

(51) Int. Cl.
*G06F 3/044* (2006.01)
*G06F 3/046* (2006.01)
*G06F 3/038* (2013.01)

(52) U.S. Cl.
CPC .............. *G06F 3/044* (2013.01); *G06F 3/046* (2013.01); *G06F 2203/04106* (2013.01)

(56) References Cited

U.S. PATENT DOCUMENTS

| | | | |
|---|---|---|---|
| 7,310,091 B2* | 12/2007 | Liu | G06F 3/03545 |
| | | | 345/157 |
| 2011/0162894 A1* | 7/2011 | Weber | G06F 3/044 |
| | | | 178/19.03 |
| 2011/0169756 A1* | 7/2011 | Ogawa | G06F 3/03545 |
| | | | 345/173 |
| 2013/0088465 A1 | 4/2013 | Geller et al. | |
| 2013/0199311 A1* | 8/2013 | Horie | G01L 1/142 |
| | | | 73/862.626 |
| 2014/0035884 A1* | 2/2014 | Oh | G06F 3/03545 |
| | | | 345/179 |
| 2014/0078105 A1 | 3/2014 | Son | |
| 2014/0204038 A1* | 7/2014 | Ohba | G06F 3/03545 |
| | | | 345/173 |
| 2014/0247238 A1 | 9/2014 | Chang | |
| 2015/0070330 A1* | 3/2015 | Stern | G06F 3/03545 |
| | | | 345/179 |
| 2015/0130772 A1 | 5/2015 | Katsurahira | |

* cited by examiner

PEN INPUT DEVICE, METHOD FOR CORRECTING INPUT COORDINATE THEREOF AND ELECTRONIC DEVICE FOR SUPPORTING THE SAME

CROSS-REFERENCE TO RELATED APPLICATION AND CLAIM OF PRIORITY

The present application is related to and claims benefit under 35 U.S.C. § 119(a) of Korean patent application filed on Nov. 28, 2014 in the Korean Intellectual Property Office and assigned Serial number 10-2014-0168679, the entire disclosure of which is hereby incorporated by reference.

TECHNICAL FIELD

The present disclosure relates to a pen input device, a method for correcting an input coordinate thereof, and an electronic device for supporting the same.

BACKGROUND

As the sizes and resolutions of displays of portable electronic devices have been increasing competitively, a demand for a function of a write input, a picture memo, or the like has been increasing accordingly. For example, functions of indicating a destination on a map, writing a message on a photo, and then transmitting the map or the photo or the like have become a main marketing point.

As a result, a user input for a specific function is sensed and a function corresponding to the sensed user input is conducted.

As a user input method, there is a method in which a user touches a user interface displayed on a display by a finger. However, when a write input is required as in Japan or China where Chinese characters are used, it is easy to conduct a picture or write input as well as being possible to enhance the accuracy thereof when a stylus pen (touch pen) rather than a finger is used. Thus, a touch function using a stylus pen is being magnified as an important factor in hardware differentiation.

The touch technique using a stylus pen can be generally classified into a pressure-sensitive method, an electrostatic method, a passive method, an active method, an electromagnetic resonance (EMR), and an electromagnetic induction method.

A pressure-sensitive pen is configured to conduct a touch or write input by applying pressure to a pressure-sensitive touch screen using a sharp tip. However, the usability of the touch screen itself is poor and there is no method of delivering the write pressure.

In addition, an electrostatic pen includes an elastic conductor (dielectric body) provided in a tip, and is configured to conduct a touch or write input by causing an electrostatic reaction on an electrostatic touch screen. Thus, there is no method for delivering the touch pressure.

Further, a passive type or active type pen merely substitutes for the role of a finger and it is impossible to differentiate a touch by the finger and a touch by the pen. Since the passive type or active type pen does not enable a proximity sensing function and a palm rejection function, an existing touch screen device cannot be used as it is unless a separate digitizer is used.

In addition, the passive type pen uses a thick tip having a thickness of 5 mm or more in order to generate an electrostatic capacity similar to that generated by a finger without using a separate battery or a coil. On the contrary, the active type pen is capable of generating an electrostatic capacity similar to that generated by a finger even if its tip is thin (2 mm) since it includes a battery or a coil built therein.

Meanwhile, an EMR type pen is capable of conducting an input through an electromagnetic induction reaction using an electromagnetic induction portion of a terminal and the pen since a terminal is configured to be active and the pen is configured to be passive. It is necessary to mount a digitizer within the touch screen device as a separate input means. The touch by the finger and the touch by the pen can be differentiated from each other with this configuration, which enables the proximity sensing function and the palm rejection function. In addition, while the most important thing is that the pen can be implemented in a small size since touch inputs of various levels can be differentiated from each other, the EMR type pen requires an input means for recognizing a plurality of coordinates.

An EMR type stylus pen input device is capable of detecting an inclined angle and an inclined direction by using two coils in hardware.

Whereas, an EMR type stylus pen input device using a single coil cannot measure the inclined angle and the inclined direction. Thus, there is a restriction in that a stylus pen or writing brush effect using the device cannot be variously used. Further, a coordinate error is caused when the tip of the stylus pen and the coil are deviated in position from each other.

In this case, in the conventional EMR type stylus pen input device using a single coil, it is necessary to discriminate a left hand and a right hand according to a setting and to confirm rotation information of a screen using a gravity sensor (G sensor). Through this, it is necessary to additionally correct an offset table of each coordinate region according to a characteristic of an EMR sheet having a coil array so as to correct an inclined angle.

There are eight tables in total according to the setting of left and right hands and the screen rotation, and the values forming the tables are composed of the values additionally corrected from values of inclined angles which are generated when a standard grip is performed using the left hand/the right hand in each of the coordinate regions, which are divided in order to correct a distortion caused by the EMR sheet.

In correcting an inclination error, however, when a pen input is performed in a direction where the rotation information is incorrect or is not coincident with a rotation since the touch screen device is laid in a horizontal direction in relation to a ground, there is a problem in that a value, in which a correction value is added to an error caused by an inclination, is generated as a coordinate error.

SUMMARY

To address the above-discussed deficiencies, it is a primary object to provide a pen input device according to various embodiments of the present disclosure configured such that supports both of an EMR pen function and a passive electrostatic stylus (touch pen) function, and to provide a method for correcting an input coordinate of the pen input device that is capable of calculating an inclined angle and an inclined direction of the pen and improving an error caused by an inclination using the EMR pen function and the passive electrostatic stylus (touch pen) function, and an electronic device that supports the method.

In accordance with an aspect of the present disclosure, an electronic device is provided. The electronic device includes: a pen input device configured to support an electromagnetic induction function and an electrostatic pen function; a touch screen device including a digitizer pad, an electrostatic capacitive touch panel disposed above the digitizer pad, a digitizer pad controller configured to detect a recognition coordinate calculated from electromagnetic induction from the digitizer pad, and a touch panel controller configured to detect an input coordinate in relation to a change of an electrostatic capacitance from the touch panel; and a processor configured to perform generation of inclination information of the pen input device and coordinate correction based on a write pressure of the pen input device, the recognition coordinate information provided by the digitizer pad controller, and the input coordinate information provided by the electrostatic capacitive touch panel controller.

In accordance with another aspect of the present disclosure, a method for correcting an input coordinate of an electronic device having a pen input device is provided. The input coordinate of the pen input device is detected as the pen input device is touched to a touch screen device of the electronic device to cause an electrostatic capacitance to be changed, a recognition coordinate is obtained by electromagnetic induction as the pen input device comes close to the touch screen device, and inclination information of the pen input device is generated to perform coordinate correction based on a write pressure of the pen input device, the recognition coordinate, and the input coordinate.

In accordance with a yet another aspect of the present disclosure, a pen input device that supports an electromagnetic induction function and an electrostatic pen function is provided. The pen input device includes: a housing formed in a rod shape with an opened end, and having a band-shaped dielectric coating portion formed on a grip portion to be grasped by a user's hand to define an accommodation space; a resonance circuit unit accommodated within the housing; a tip configured to be movable by a predetermined range in a longitudinal direction of the housing, the tip including a contact portion that is installed to protrude outwardly from the opened end of the housing so that a pressure is applied thereto, the contact portion being made of a dielectric material or configured by being bonded to be enclosed by a dielectric material; and a channel configured to interconnect the contact portion of the tip and the dielectric coating portion of the housing grip portion.

In accordance with yet another of the present disclosure, a method of correcting an input coordinate of a pen input device is provided. The input coordinate of the pen input device is detected as the pen input device is touched to a touch screen device of the electronic device to cause an electrostatic capacitance to be changed, a recognition coordinate is obtained by electromagnetic induction as the pen input device comes close to the touch screen device, and inclination information of the pen input device is generated to perform coordinate correction based on a write pressure of the pen input device, the recognition coordinate, and the input coordinate.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device can be implemented in hardware, firmware or software, or some combination of at least two of the same. It should be noted that the functionality associated with any particular controller can be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
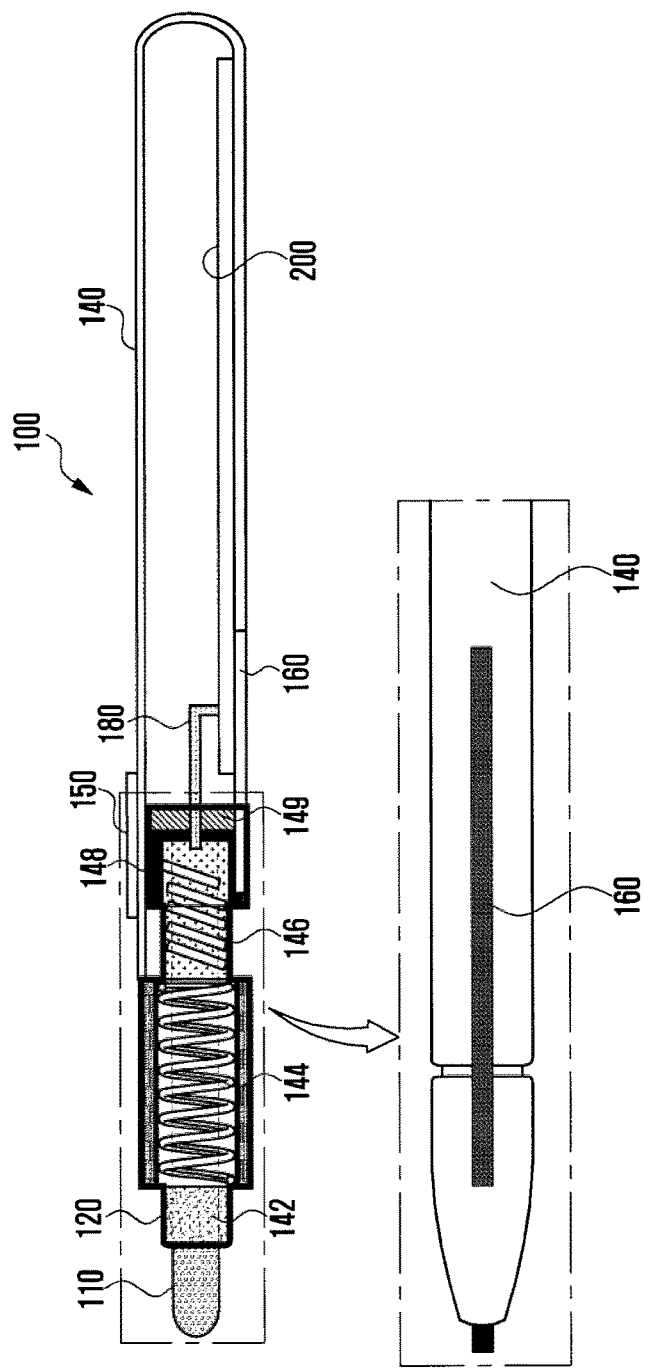
FIG. 1 is a schematic view illustrating a configuration and an operation of a pen input device according to various embodiments of the present disclosure.

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged mobile device. Hereinafter, the present disclosure will be described with reference to the accompanying drawings. The present disclosure may have various embodiments, and modifications and changes may be made therein. Therefore, the present disclosure will be described in detail with reference to particular embodiments shown in the accompanying drawings. However, it should be understood that there is no intent to limit the present disclosure to the particular forms, and the present disclosure should be construed to cover all modifications, equivalents, and/or alternatives falling within the spirit and scope of the present disclosure. In describing the drawings, the same or similar elements are designated by similar reference numerals.

The following description with reference to the accompanying drawings is provided to assist in a comprehensive understanding of various embodiments of the present disclosure as defined by the claims and their equivalents. The following description includes various details to assist in that understanding, but these details are to be regarded as mere examples. Accordingly, various changes and modifications of the various embodiments described herein can be made without departing from the scope and spirit of the present disclosure. In addition, descriptions of well-known functions and constructions can be omitted for clarity and conciseness.

An electronic device according to various embodiments of the present disclosure includes a communication function. For example, the device can be a combination of devices including at least one of a smartphone, a tablet personal computer (PC), a mobile phone, a video phone, an e-book reader, a desktop PC, a laptop PC, a netbook computer, a personal digital assistant (PDA), a portable multimedia player (PMP), a digital audio player, a mobile medical device, an electronic bracelet, an electronic necklace, an electronic accessory, a camera, a wearable device, an electronic clock, a wrist watch, home appliances (e.g., an air-conditioner, vacuum, an oven, a microwave, a washing machine, an air cleaner, and the like), an artificial intelligence robot, a television (TV), a digital video disc (DVD) player, an audio device, various medical devices (for example, magnetic resonance angiography (MRA), magnetic resonance imaging (MRI), computed tomography (CT), a scanning machine, a ultrasonic wave device, or the like), a navigation device, a global positioning system (GPS) receiver, an event data recorder (EDR), a flight data recorder (FDR), a set-top box, a TV box (for example, SAMSUNG HOMESYNC™, APPLE TV®, or GOOGLE TV®), an electronic dictionary, vehicle infotainment device, an electronic equipment for a ship (for example, navigation equipment for a ship, gyrocompass, or the like), avionics, a security device, electronic clothes, an electronic key, a camcorder, game consoles, a head-mounted display (HMD), a flat panel display device, an electronic frame, an electronic album, furniture or a portion of a building/structure that includes a communication function, an electronic board, an electronic signature receiving device, a projector, and the like. It is obvious to those skilled in the art that the electronic device according to the present disclosure is not limited to the aforementioned devices.

Figure 2:
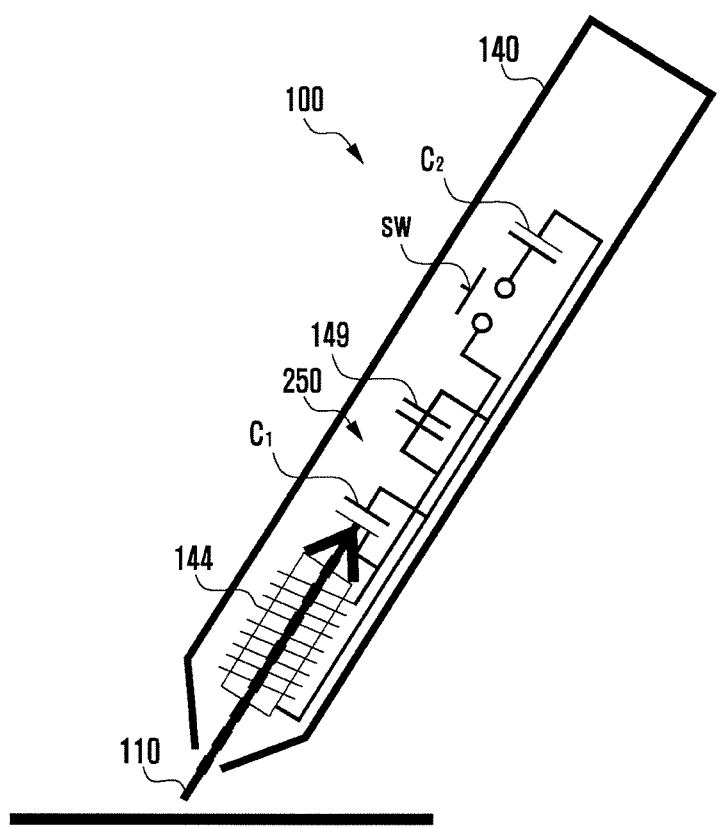
FIG. 2 is a view illustrating a configuration and operation of a resonance circuit unit mounted in an accommodation space of a housing of FIG. 1.

FIG. 1 illustrates a configuration and an operation of a pen input device according to various embodiments of the present disclosure, and FIG. 2 is a view illustrating a configuration of a resonance circuit unit mounted in an accommodation space of a housing of FIG. 1.

Referring to FIG. 1, according to various embodiments of the present disclosure, a pen input device 100 is a hybrid stylus pen of electromagnetic induction and electrostatic types that has a conductive tip 110, and includes a housing 140 that is opened at one end thereof and defines an accommodation space for accommodating a pen core 120 therein.

The conductive tip 110 is installed to protrude to the outside from the opened end of the housing 140, and is movable by a predetermined range to the accommodation space in the longitudinal direction toward the other end of the housing 140. The conductive tip 110 can be self-centered. Here, the term, "self-centered," can mean that when an object is deformed, it can be automatically returned to its original position.

The conductive tip 110 is configured as a dielectric body that is formed of a conductive rubber or a metallic material, or is configured such that the dielectric body is mounted, installed, attached, adhered, or fused to a plastic tip to be enclosed by the plastic tip. For example, the dielectric body can be adhered to the plastic tip by using a double-sided tape, an adhesive, or the like to be enclosed by the plastic tip.

The housing 140 includes a ferrite core 142, an electromagnetic induction unit coil 144, an elastic body 146, a support portion 148, a variable capacitor 149, and a printed circuit board 200.

The housing 140 further includes a push button key 150, and the push button key 150 can be positioned on a grip portion of the housing 140 which is normally grasped by the user when using the pen input device 100.

The elastic body 146 is mounted to conduct a function that corresponds to the movement of the tip 110. For example, the elastic body 146 can include a spring or the like that can be contracted by a length corresponding to the moving distance of the tip 110 into the accommodation space of the housing 140 when the pen input device 100 conducts an input (e.g., a touch input event or a drag input event on a display).

Referring to FIG. 2, in the accommodation space of the housing 140, a resonance circuit unit 250 can be mounted.

The mounted resonance circuit unit 250 includes an electromagnetic induction unit coil 144 for an electromagnetic induction resonance operation, a Variable Capacitor (VC) 149, capacitors C1 and C2, and a switch SW as an equivalent circuit, and does not require a power supply.

The electromagnetic induction unit coil 144 is an inductor (L) coil, the capacitor C1 is a main capacitance of the resonance circuit unit 250, the variable capacitor 149 has a capacitance that is variable according to the write pressure of the pen input device 100, i.e., the pressure applied to the tip 110, which causes a resonance frequency to be changed, through which the write pressure can be transferred to the terminal in the direction indicated by an arrow.

The switch SW is a push button key 150 of the pen input device 100. When the push button key 150 is pushed, the switch SW is connected to the capacitor C2 so that the resonance frequency varies, through which the button push operation can transferred to the terminal.

The resonance circuit unit 250 includes an element of which the impedance varies according to the pressure applied when writing.

According to the variation of the impedance, the resonance frequency of the pen input device 100 varies, and the electromagnetic induction frequency of the pen input device 100 can also vary, so that the frequency of a magnetic signal returned back to a digitizer can also vary.

Through this, the digitizer can sense the write pressure. The impedance variation element can undergo inductance variation or variable capacitance (VC) variation.

Meanwhile, according to various embodiments of the present disclosure, the pen input device 100 includes a band-shaped dielectric coating portion 160 that is formed on the grip portion on a side portion of the housing 140 which is grasped by a user's hand.

The pen input device 100 further includes a single antenna channel 180 formed of a conductive line of a conductive fiber that interconnects a contact portion of the dielectric body or the tip 110, to which the dielectric body is bonded to be enclosed, and the dielectric coating portion 160 of the grip portion of the housing 140.

In this way, the pen input device 100 according to an embodiment of the present disclosure is additionally provided with an electrostatic pen function capable of performing a coordinate input through an electrostatic touch screen panel by interconnecting the tip 110 of the pen input device 100 and the dielectric coating portion 160 of the grip portion by the configuration of the single antenna channel 180 made of a conductive line of a conductive fiber.

As the electromagnetic induction unit of the pen input device 100 and a part of the conductive fiber are mounted in the inside of the ferrite core 142 or penetrate the inside of the ferrite core 142, the electromagnetic induction unit of the pen input device 100 and a part of the conductive fiber are electrically isolated from the electromagnetic induction coil 144 mounted on the outside of the ferrite core 142 so that interference can be minimized.

In addition, the single antenna channel 180 of the conductive fiber can be connected with the printed circuit board 200 of the pen input device 100. By this, as the electrostatic capacitance increases, an electric coupling can be generated in a level that is sufficient to allow the electrostatic touch screen panel to recognize a coordinate.

When the user grasps the grip portion of the housing 140, charge mobility from the touch screen panel to the hand (ground) is enhanced, so that an electrostatic touch coordinate can be obtained without increasing the area of the dielectric coating surface 160.

As described above, the pen input device 100 of the present disclosure is a hybrid stylus pen type of the electromagnetic induction type and the electrostatic type, and the terminal is configured as an active unit and the pen is configured as a passive unit. Thus, an input can be executed through an electromagnetic induction reaction using the terminal and the electromagnetic induction unit of the pen.

That is, since the resonance circuit unit 250 of the pen input device 100 of the present disclosure is configured by connecting the inductor (L) coil 144 and the capacitors C1 and C2 in parallel, an electromagnetic induction phenomenon is generated when the pen input device 100 comes close to the touch screen device.

According to this, an Electro-Magnetic (EM) field is generated from the digitizer of the terminal, and the generated electromagnetic field is received by the resonance circuit unit 250 of the pen input device 100 so that a current is generated. With the current generated in the pen input device 100, a magnetic field can be formed.

The digitizer of the terminal scans this so as to determine the coordinate of the pen input device 100 based on a difference in signal intensity.

Figure 3:
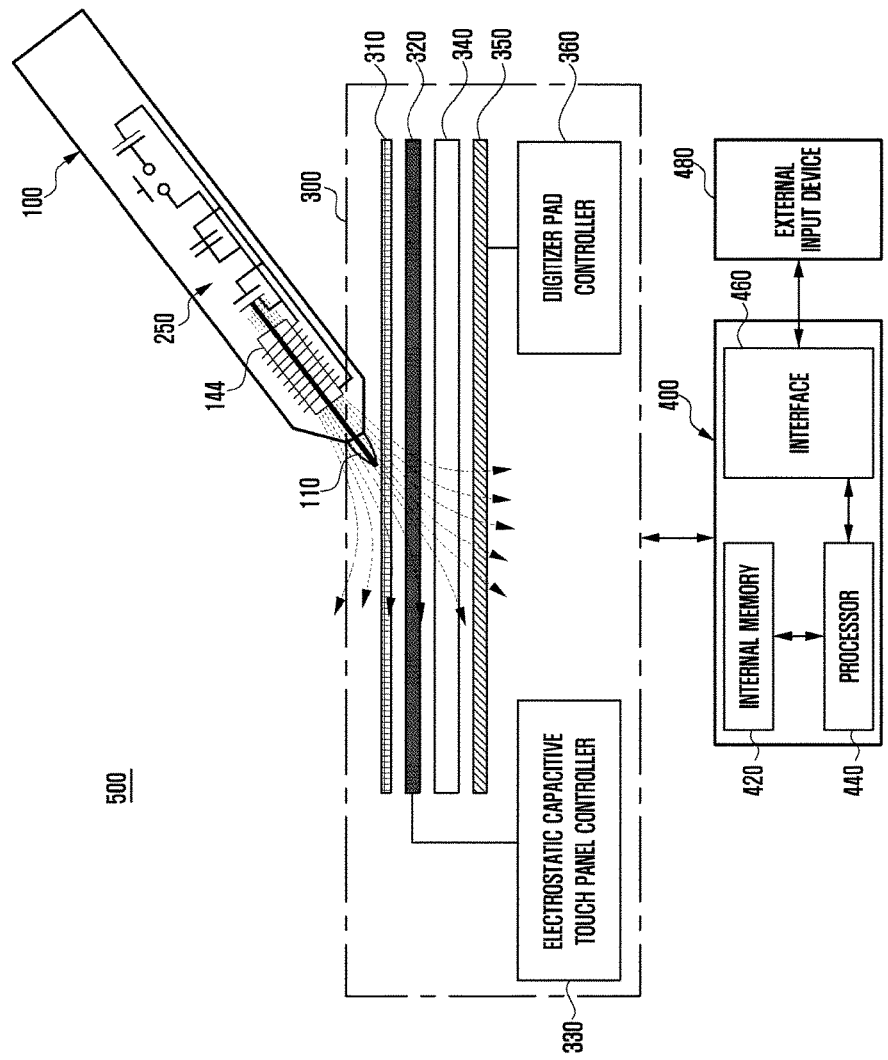
FIG. 3 is a schematic view illustrating an electronic device using the pen input device of FIG. 1.

FIG. 3 illustrates a configuration of an electronic device 500 using the pen input device of FIG. 1 according to various embodiments of the present disclosure.

Referring to FIG. 3, according to various embodiments of the present disclosure, the electronic device 500 includes the pen input device 100 of the hybrid stylus pen of the electromagnetic induction type and the electrostatic type, a touch screen device 300, and a host device 400.

The touch screen device 300 can simultaneously perform data input and output functions by providing an input/output interface between the electronic device 500 and the user. Further, the touch screen device 300 can transfer a user's touch input, which is sensed by applying a touch sensing technique, to a host device 400, and can show visual information, which is provided from the host device 400, such as a text, a graphic, or a video, to the user.

The touch screen device 300 includes a configuration, in which a screen window 310, an electrostatic capacitive touch panel 320, an electrostatic capacitive touch panel controller 330, a display panel 340, a digitizer pad 350, and a digitizer pad controller 360 are sequentially laminated.

The screen window 310 can be a region, on which an external input, such as a touch input, is performed by being touched by an external pen input device 100, a conductor (e.g., a finger or a palm of a human body), or the like. For example, the screen window 310 can be a glass processed with a reinforcement coating or an oleophobic coating. Further, the screen window 310 can be formed using at least one of alumina, silica, and sapphire.

According to one embodiment, the screen window 310 is formed of a transparent material, and the screen window 310 can be bonded to the electrostatic capacitive touch panel 320 using an adhesive or can be fixed to a body that forms the external appearance of the electronic device 500.

As the adhesive, a super view resin, an optically clear adhesive, or the like can be used.

The electrostatic capacitive touch panel 320 includes a plurality of electrode lines including a plurality of electrodes which are formed alternately and in parallel with each other. The electrostatic capacitive touch panel 320 forms an electric field for sensing a touch by receiving a voltage applied from the electrostatic capacitive touch panel controller 330, and changes the electrostatic capacitance thereof when the contact portion of the tip 110 of the pen input device 100 and the dielectric coating portion 160 included in the grip portion of the housing 140 come in contact therewith or come close thereto.

Through the change of the electrostatic capacitance from the electrostatic capacitive touch panel 320, the touch screen device 300 detects the touch position of the tip 110 of the pen input device 100 as a final input coordinate.

The electrostatic capacitive touch panel controller 330 performs a control such that a voltage is supplied to the electrostatic capacitive touch panel 320 laminated on one side of the screen window 310.

According to an embodiment, as the conductive tip 110 mounted at one end of the pen input device 100 comes close to the screen window 310 within a critical distance value from the screen window 310, the electrostatic capacitive touch panel controller 330 can cause a reception electrode (not illustrate) of the electrostatic capacitive touch panel 320 to acquire charges, of which the amount varies according to the proximity or contact of the pen input device 100 or a conductive object (e.g., a finger of a human body) in relation to the screen window 310.

The electrostatic capacitive touch panel controller 330 can provide a position, which is sensed by the conductive tip 110 of the pen input device 100 based on the amount of charges acquired by the reception electrode, to the host device 400, and a processor 440 of the host device 400 can conduct an operation according to it. That is, the electrostatic capacitive touch panel controller 330 controls the display panel 340 to display the user interface.

In addition, the electrostatic capacitive touch panel controller 330 can provide coordinate information that includes whether it is a passive stylus or not.

The digitizer pad 350 includes an FPCB that includes a plurality of loop antenna coils which are overlapped with each other in X-axis and Y-axis arrangement directions. The digitizer pad 350 provides an alternating current to the digitizer pad controller 360 and generates an electromagnetic field.

In addition, the digitizer pad 350 includes, on the rear surface thereof, a shield plate for shielding noise.

The digitizer pad controller 360 can provide a write pressure and coordinate information of the pen input device 100.

When the pen input device 100 comes in contact with or comes close to the electromagnetic field of the digitizer pad 350, the resonance circuit unit 250 of the pen input device 100 can generate a current and a magnetic field can be formed in the resonance circuit unit 250 by the current.

The digitizer pad controller 360 scans the intensity of the magnetic field applied to the digitizer pad 350 from the pen input device 100 over the entire region so as detect a position, and provides the detected position to the host device 400 as a recognition coordinate, and the processor 440 of the host device 400 performs an operation in response thereto. For example, the processor 440 outputs image information, such as a text, a graphic, or a video, to the display panel 340.

The display panel 340 outputs a screen that is generated using coordinate information, and the write pressure, the inclined angle, and the inclined direction of the pen input device 100.

Meanwhile, when the write pressure of the stylus pen 100 and the coordinate of the passive electrostatic capacitive stylus are simultaneously input, the coordinate of the passive electrostatic capacitive stylus is used first.

The host device 400 includes an internal memory 420, one or more processors 440, and an interface 460, each of which can be a separate constituent element or can be configured as one or more integrated circuits.

The internal memory 420 includes a conversion table for correcting a coordinate.

The processor 440 can execute various software programs so as to perform a processing and a control for a sound, an image, or a data communication of the electronic device 500. In addition, a method of an embodiment of the present disclosure can be performed by executing a specific software module (a command set) stored in the internal memory 420 and/or an external memory (not illustrated).

The interface 460 can connect other various devices 480 of the electronic device 500 with the host device 400. The other various devices 480 include, for example, an external memory, a camera device, a sensor device, a wireless communication device, an audio device, an external port device, etc.

As described above, according to the electronic device of the present disclosure, since the touch position of the tip 110, which is set by the electrostatic capacitive touch panel controller 330, is used as an input coordinate, and coordinate information, which includes the position detected by the digitizer pad controller 360 as a recognition coordinate, is provided to the host device 400, the host device 400 can generate inclination information of the pen using the coordinate information, and can perform coordinate correction using the conversion table included in the internal memory 420.

Figure 4A:
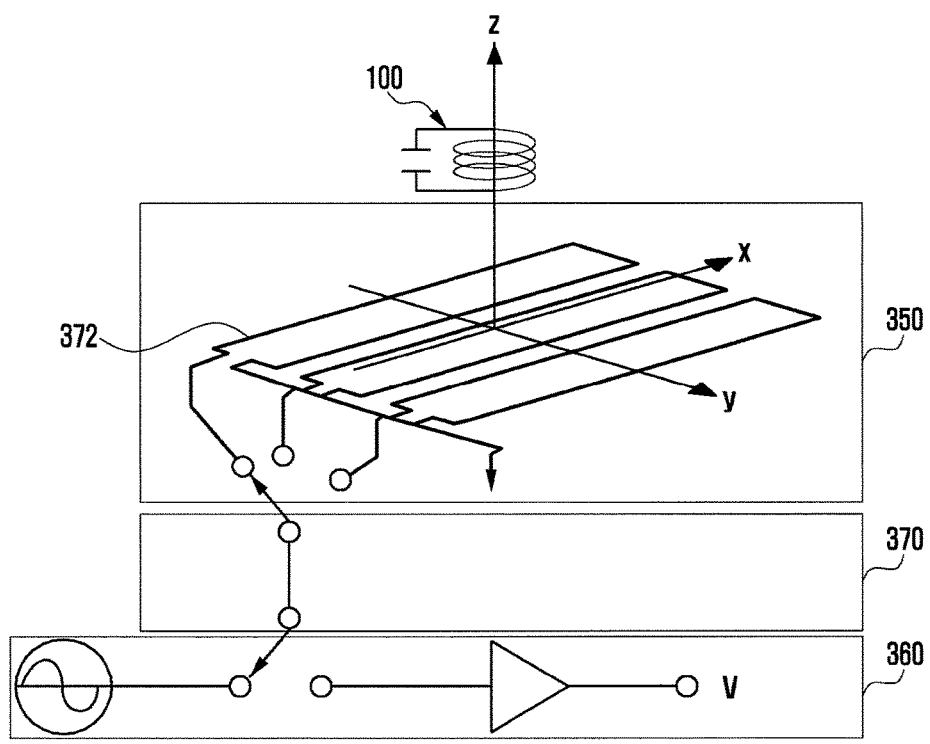
FIGS. 4A and 4B are schematic views illustrating a digitizer pad controller.
Figure 4B:
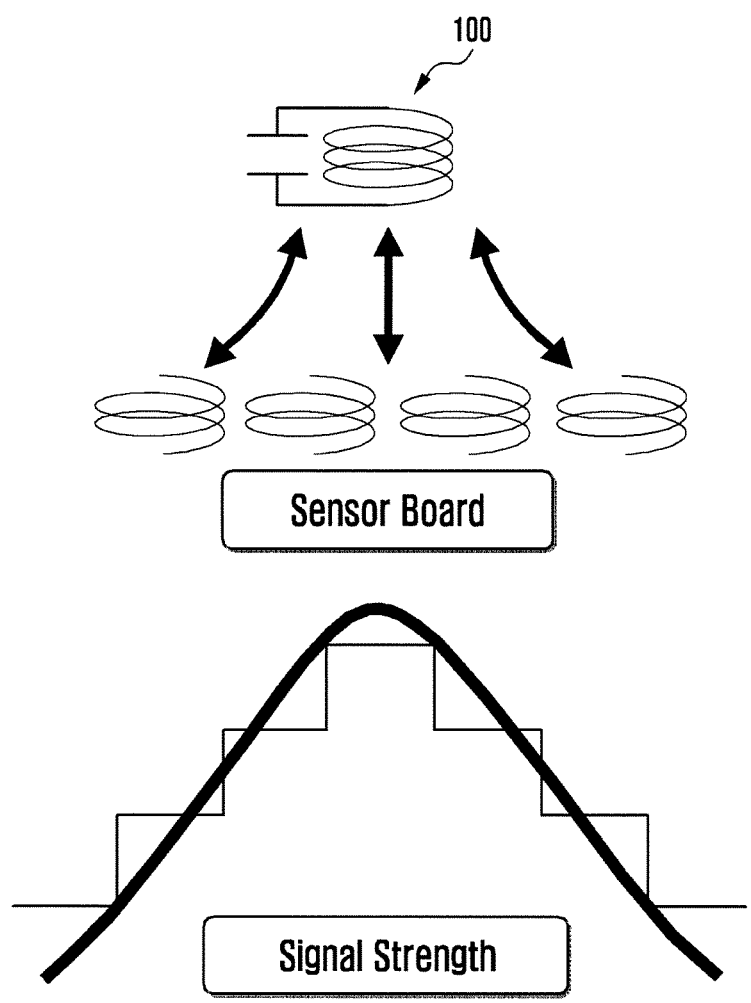

FIGS. 4A and 4B illustrate a digitizer pad controller.

As illustrated in FIG. 4A, the digitizer panel controller 360 can discharge a varying current by selecting one of the loop antenna coils 372 included in the digitizer pad 350 by a coil switching unit 370.

As a result, a magnetic field can be generated from the loop antenna, and a change the resonance frequency of an electromagnetic field corresponding to a push force applied by the pen input device 100 (e.g., a force applied per a unit area, or a write pressure applied to a predetermined region of the screen window 310).

That is, the digitizer pad controller 360 can determine the pressure data of the pen input device 100 based on the change of the resonance frequency of the sensed electromagnetic field. For example, when the pressure intensity of the pen input device 100 in relation to the screen window 310 corresponds to a predetermined level, the digitizer pad controller 360 can determine the sensed pressure data as data corresponding to a predetermined level, and the determined pressure data can be transferred to the processor 440 of the host device 400.

The processor 440 can perform a control such that a thickness corresponding to the pressure data is displayed on the user interface 460 based on the pressure data transferred from the touch screen device 300.

In addition, the digitizer pad controller 360 can determine whether the pen input device 100 exists within a critical distance value from the screen window 310 based on the change of the sensed electromagnetic field.

According to the determined result, the pen input device 100 can confirm a position region sensed on the screen window 310, and can transfer the information for the sensed position region to the processor 440.

When a touch input event is sensed in a position region which is not sensed by the pen input device 100, i.e. a position region exceeding the critical distance value, the processor 440 can perform a control such that the function corresponding to the sensed touch input event is deactivated.

When the pen input device 100 passes through a generated magnetic field, the pen input device 100 can store energy in the resonance circuit unit 250 of the pen input device 100 through electromagnetic induction.

The digitizer pad controller 360 senses an approximate position of the pen input device 100 through scanning. Thereafter, as illustrated in FIG. 4B, a plurality of antenna coils around the pen input device 100 (a sensor board in the drawing) is scanned to be used as information for calculating a correct coordinate of the pen input device 100.

As the pen input device 100 of the present disclosure uses the electromagnetic induction as described above, the coordinate of the pen input device 100 can be detected even if it is not in contact with the digitizer pad 350.

Figure 5:
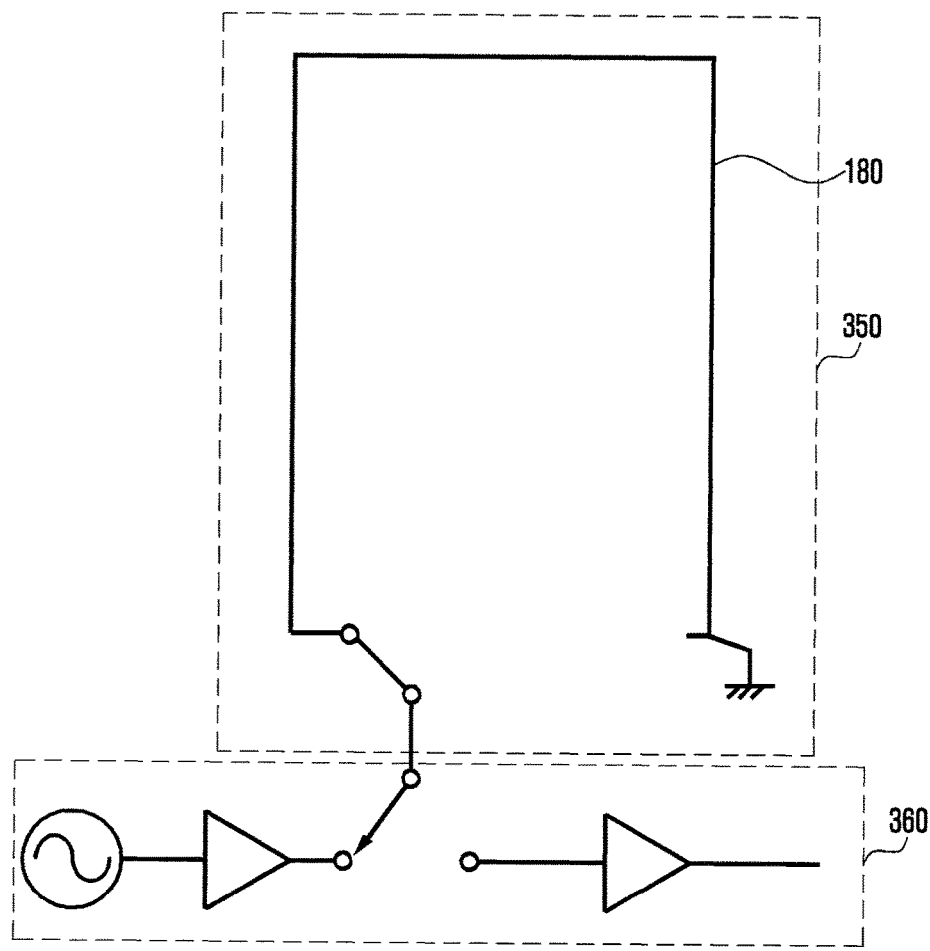
FIG. 5 is a schematic view for describing an electrostatic coordinate recognition operation of the pen input device according to various embodiments of the present disclosure.

FIG. 5 illustrates a configuration of an electrostatic capacitive touch panel (C-TSP) used as a coordinate recognition means of the pen input device 100.

The electrostatic capacitive touch panel (C-TSP) 320 is a touch input means. An existing electrostatic capacitive touch panel is capable of recognizing a touch coordinate only when a conductor/dielectric body having a predetermined size (of about a finger touch area) is touched. However, the electrostatic capacitive touch panel 320 used in the present embodiment is capable of recognizing a touch coordinate of a conductor/dielectric body even if the conductor/dielectric body has a thickness of about 1 mm.

That is, the thickness of the tip 110 of the pen input device 100 of the present disclosure can be thin and a pressure is transferred to a variable impedance, which is varied by the pressure applied to the tip 110, so that the impedance is changed. In addition, the resonance frequency of the electromagnetic induction unit of the pen input device 100 is changed, and according to the change of the resonance frequency, the frequency of the magnetic field, which is generated by the pen input device 100 by the electromagnetic induction, can be changed.

In addition, since the frequency change of the magnetic field can be recognized, the pushing of the button SW of the push button key 150 can be recognized.

When the push button key 150 is pushed, the capacitor C2 is connected so that the resonance frequency of the pen input device 100 can be changed.

In addition, similar to the operation of a general electrostatic pen, a part of a pulse signal transmitted from a transmitter to the conductive fiber channel 180 is inducted so that the coupling voltage of a receiver can be changed, through which, the coordinate of the pen input device 100 can be recognized.

Figure 6A:
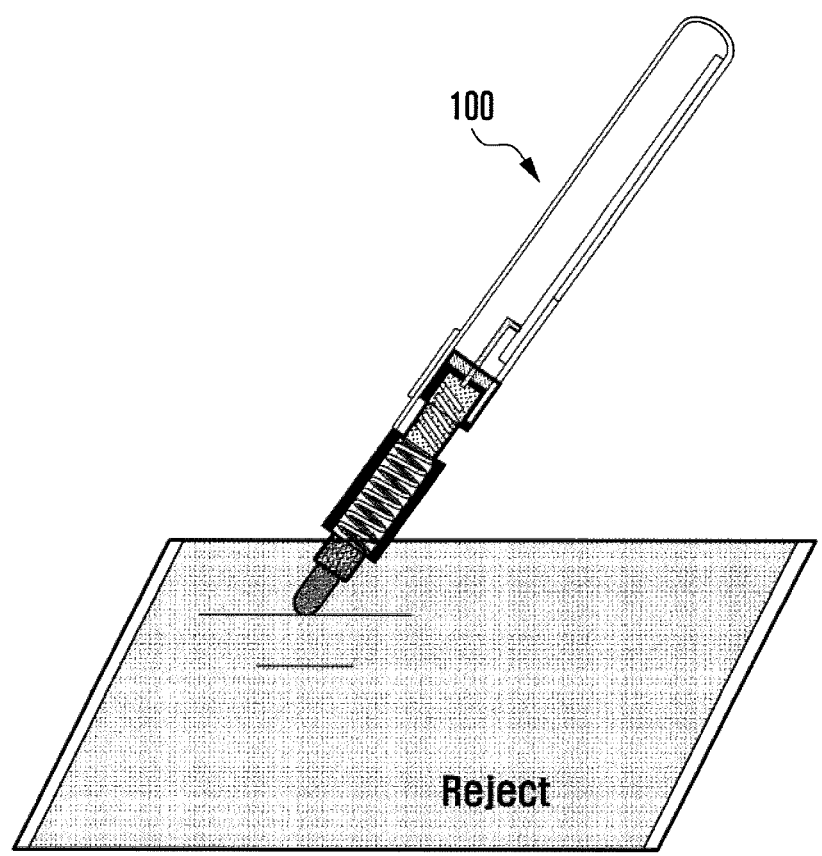
FIGS. 6A and 6B are schematic views for describing a palm rejection function using a position of the pen input device according to various embodiments of the present disclosure.
Figure 6B:
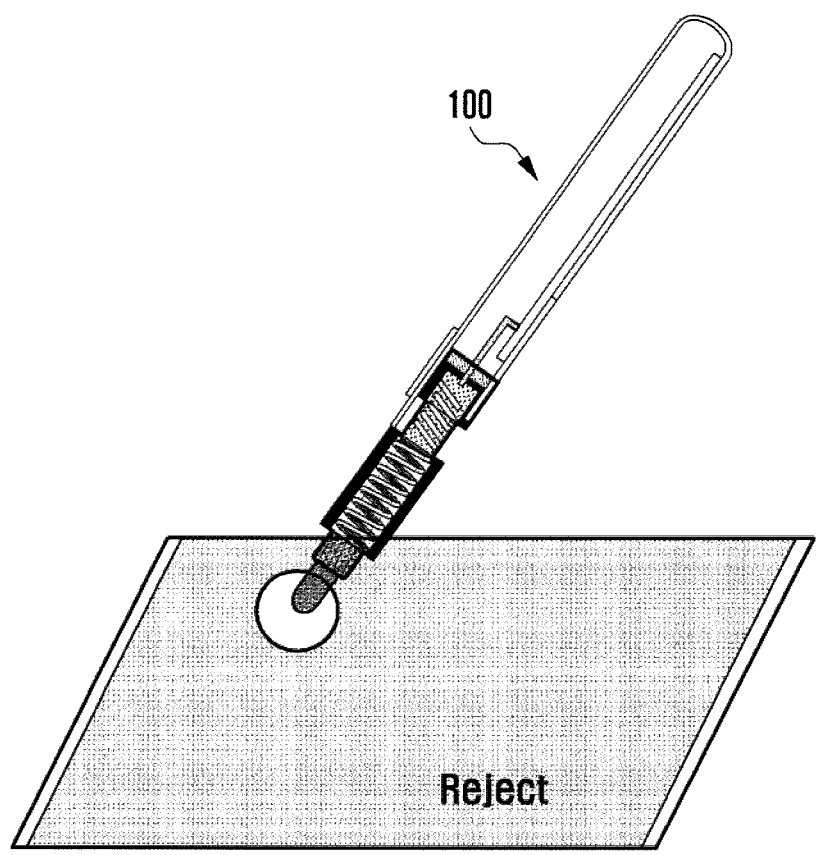

FIGS. 6A and 6B illustrate a palm rejection function using the position of the pen input device according to various embodiments of the present disclosure.

When the digitizer pad 350 senses the hovering of the pen input device 100, all the coordinates, which have been recognized by the electrostatic capacitive touch panel controller 330 until the hovering is separated, can be rejected, as illustrated in FIG. 6A.

In addition, when a write pressure of the pen input device 100 exists, as illustrated in FIG. 6B, in a case where a passive stylus coordinate within a designated distance from an EMR coordinate is separately recognizable, or when a touch coordinate is simultaneously recognized, it is used as the stylus coordinate and the EMR coordinate can be used so as to calculate the inclined direction and the inclined angle. At this time, the passive stylus coordinate and the touch coordinate out of the range can be rejected.

When a write input is initiated by recognizing a write pressure, the coordinate of the pen input device 100 can be recognized by the electrostatic capacitive touch panel 320, and the write pressure can be recognized by the digitizer pad 350.

An output corresponding to the write pressure, which is recognized at the position of the coordinate of the recognized pen input device 100, can be output to the screen window 310.

Figure 7:
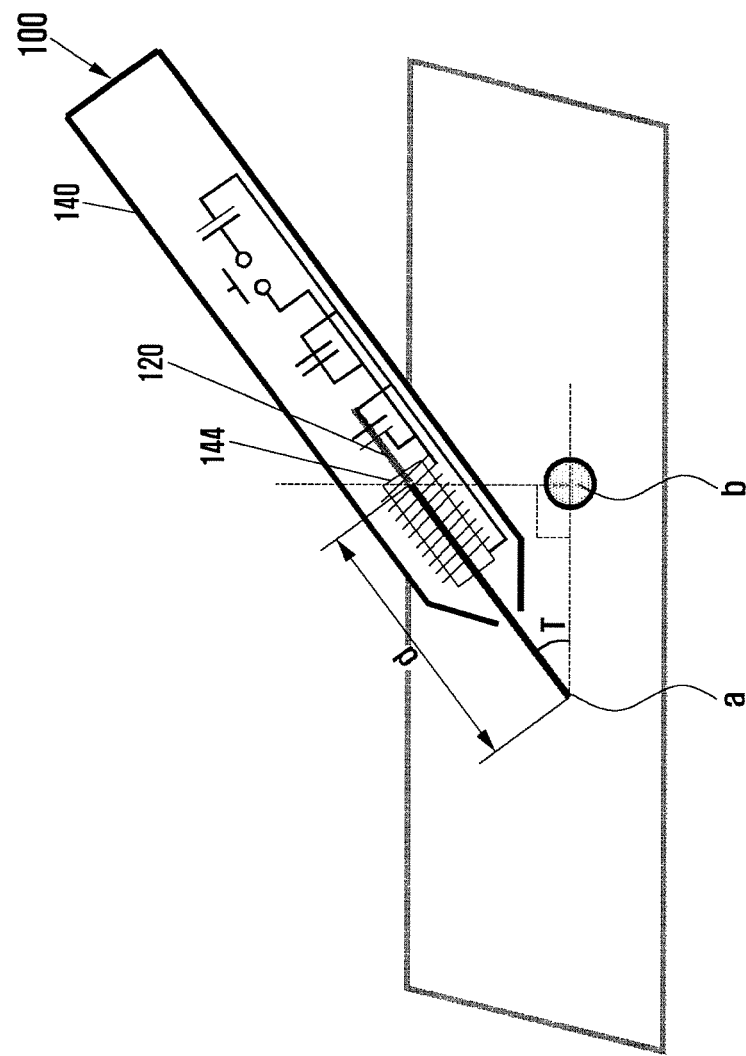
FIG. 7 is a view for describing a method of calculating an inclined direction (azimuth) according to an embodiment of the present disclosure.

FIG. 7 is a schematic view for describing the measurement of the inclined angle and inclined direction of the pen input device according to various embodiments of the present disclosure.

As illustrated in FIG. 7, the inclined angle of the pen input device 100 can be measured by Equation 1 as follows.

$$T=\mathrm{archcos}(\sqrt{((Xb-Xa)^2+(Yb-Ya)^2}/d) \quad (1)$$

Here, T is an inclined angle, a is an input coordinate input by touching by the tip 110 of the passive electrostatic stylus pen as the pen input device 100, b is a recognition coordinate obtained by electromagnetic induction, d is a distance between the tip 110 of the pen input device 100 and the coil center of the electromagnetic induction unit, and f indicates a write pressure of the pen input device 100. At this time, the distance d is changed depending on the write pressure f, and thus can be calculated through table conversion (or arithmetic operation).

As described above, the processor 440 can calculate Equation 1 using the coordinate information provided by the electrostatic capacitive touch pad controller 330 and the digitizer pad controller 360, and then can generate inclination information (i.e. can calculate the inclined angle T) through arccosine table conversion (or arithmetic operation).

In addition, a unit vector V of the inclined angle (azimuth) of the pen input device 100 can be measured by Equation 2 as follows.

$$V=((Xb-Xa)/(\sqrt{((Xb-Xa)2+(Yb-Ya)2})?(Yb-Ya)/(\sqrt{((Xb-Xa)2+(Yb-Ya)2}) \quad (2)$$

As described above, according to various embodiments of the present disclosure, the processor of the electronic device 500 is capable of calculating the unit vector V in the inclined direction by performing an arithmetic operation through Equation 2 using the coordinate information provided by the electrostatic capacitive touch pad controller 330 and the digitizer pad controller 360, and can perform coordinate correction to the unit vector V by calculating an azimuth through the conversion (or arithmetic operation) using the table stored in the internal memory 420.

As described above, according to an embodiment of the present disclosure, a pen input device is a hybrid stylus pen that uses a single coil supporting both of an EMR pen function and a passive electrostatic stylus (touch pen) function. According to the pen input device, a frequency change of a magnetic field, which is generated by an electromagnetic induction method, is capable of being recognized by a single channel digitizer so as to recognize a write pressure of the pen input device, and based on this, an inclined angle and an inclined direction can be calculated and the error caused by the inclination can be improved.

According to embodiments of the present disclosure, since both the EMR pen function and the passive electrostatic stylus (touch pen) function can be supported using the single coil, and based on this, the inclined angle and the inclined direction can be calculated and the error caused by the inclination can be improved, there is an advantage in that more accurate coordinate information can be provided.

In addition, since the tip of the pen and the band-shaped portion on the housing grip portion are made of a dielectric material, charge mobility from a touch screen panel to a hand (ground) can be enhanced to improve an SNR (Signal to Noise Ratio), a more accurate electrostatic touch coordinate can be obtained without greatly increasing the area of the dielectric material, and the electrostatic touch coordinate obtained thereby can be used as a final input coordinate.

Furthermore, according to the present disclosure, since an inclination error can be improved using a write pressure and an EMR coordinate regardless of an input direction, and an inclined angle and an inclined direction can be provided, more accurate coordinate information can be provided.

Although the present disclosure has been described with embodiments, various changes and modifications can be suggested to one skilled in the art. It is intended that the present disclosure encompass such changes and modifications as fall within the scope of the appended claims.

What is claimed is:

1. An electronic device comprising:
    a pen input device configured to support an electromagnetic induction function and an electrostatic pen function;
    a touch screen device including a digitizer pad, an electrostatic capacitive touch panel disposed above the digitizer pad, a digitizer pad controller configured to detect a recognition coordinate calculated from electromagnetic induction from the digitizer pad, and a touch panel controller configured to detect an input coordinate in relation to a change of an electrostatic capacitance from the electrostatic capacitive touch panel; and
    a processor configured to:
        perform generation of inclination information of the pen input device as a function of a write pressure of the pen input device, the recognition coordinate provided by the digitizer pad controller and the input coordinate provided by the touch panel controller, and
        perform coordinate correction based on the inclination information of the pen input device.

2. The electronic device of claim 1, further comprising an internal memory that includes a conversion table for performing the coordinate correction.

3. The electronic device of claim 1, wherein the processor measures the inclination information of the pen input device by an equation defined as:

$$T=\mathrm{archcos}(\sqrt{((Xb-Xa)^2+(Yb-Ya)^2}/d)$$

wherein "T" is an inclined angle, "a" is an input coordinate input by touching by a tip of the pen input device, "b" is a recognition coordinate obtained by electromagnetic induction, and "d" is a distance between the tip of the pen input device and a coil center of an electromagnetic induction unit.

4. The electronic device of claim 3, wherein the distance "d" is changed depending on the write pressure of the pen input device, and is calculated through table conversion or an arithmetic operation.

5. The electronic device of claim 3, wherein the processor measures a unit vector "V" of a direction of the inclined angle of the pen input device by performing an arithmetic operation through an equation defined as:

$$V=((Xb-Xa)/(\sqrt{((Xb-Xa)^2+(Yb-Ya)^2)})(Yb-Ya)/(\sqrt{((Xb-Xa)^2+(Yb-Ya)^2)})$$

and calculates the unit vector "V" by performing table conversion or arithmetic operation on the measured unit vector "V".

6. The electronic device of claim 1, wherein the touch screen device detects a touch position of a tip of the pen input device as a final input coordinate through the change of the electrostatic capacitance from the electrostatic capacitive touch panel.

7. A method for correcting an input coordinate of an electronic device having a pen input device, the method comprising:
   detecting the input coordinate of the pen input device when the pen input device is touched to a touch screen device of the electronic device causing an electrostatic capacitance to be changed;
   obtaining a recognition coordinate by electromagnetic induction when the pen input device approaches the touch screen device;
   generating inclination information of the pen input device as a function of a write pressure of the pen input device, the recognition coordinate, and the input coordinate; and
   performing coordinate correction based on the inclination information of the pen input device.

8. The method of claim 7, wherein the input coordinate is detected in relation to a change of the electrostatic capacitance of an electrostatic capacitive touch panel of the touch screen device by a touch panel controller of the touch screen device.

9. The method of claim 7, wherein the recognition coordinate obtained by the electromagnetic induction from a digitizer pad of the touch screen device is detected by a digitizer pad controller of the touch screen device.

10. The method of claim 7, wherein the coordinate correction is performed by using a conversion table included in an internal memory of the electronic device.

11. A pen input device that supports an electromagnetic induction function and an electrostatic pen function, the pen input device comprising:
   a housing formed in a rod shape with an opened end, and having a band-shaped dielectric coating portion formed on a grip portion to be grasped by a user's hand to define an accommodation space;
   a resonance circuit unit accommodated within the housing and configured to provide a resonance frequency;
   a tip configured to be movable by a predetermined range in a longitudinal direction of the housing, the tip including a contact portion that is installed to protrude outwardly from the opened end of the housing such that a pressure applied to the tip causes a change in the resonance frequency, the contact portion being made of a dielectric material or configured by being bonded to be enclosed by a dielectric material; and
   a channel configured to interconnect the contact portion of the tip and the band-shaped dielectric coating portion of the grip portion, wherein the channel is electrically isolated from a coil of the resonance circuit unit.

12. The pen input device of claim 11, wherein the resonance circuit unit includes the coil of an electromagnetic induction unit, a variable capacitor, a capacitor, and a switch, and
   a write pressure of the pen input device is transferred to a terminal according to the pressure applied to the tip.

13. The pen input device of claim 11, wherein the grip portion of the housing further include a push button key, and button pushing is transferred to a terminal.

14. The pen input device of claim 11, wherein the housing includes an electromagnetic induction unit of the resonance circuit unit, a ferrite core configured such that a part of the channel is installed within the ferrite core or passes through the ferrite core, an elastic body configured to be contracted to correspond a movement of the tip, and a printed circuit board.

15. The pen input device of claim 14, wherein the coil of the electromagnetic induction unit is mounted outside the ferrite core to be electrically isolated from the ferrite core.

16. The pen input device of claim 14, wherein the channel is connected to the printed circuit board.

17. A method of correcting an input coordinate of a pen input device, the method comprising:
   detecting the input coordinate of the pen input device when the pen input device is touched to a touch screen device of an electronic device causing an electrostatic capacitance to be changed;
   obtaining a recognition coordinate by electromagnetic induction when the pen input device approaches the touch screen device;
   generating inclination information of the pen input device as a function of a write pressure based on a change in resonance frequency, the obtained recognition coordinate and the detected input coordinate; and
   performing coordinate correction based on the inclination information of the pen input device.

18. The method of claim 17, wherein the input coordinate is detected in relation to a change of the electrostatic capacitance from an electrostatic capacitive touch panel of the touch screen device by a touch panel controller of the touch screen device.

19. The method of claim 17, wherein the recognition coordinate obtained by the electromagnetic induction from a digitizer pad of the touch screen device is detected by a digitizer pad controller of the touch screen device.

20. The method of claim 17, wherein the coordinate correction is performed by a conversion table.

* * * * *